Jan. 22, 1957  G. VAN LEEUWEN  2,778,194
FLOW CONTROL GATES
Filed June 4, 1952  2 Sheets-Sheet 2
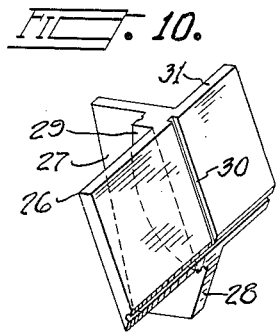
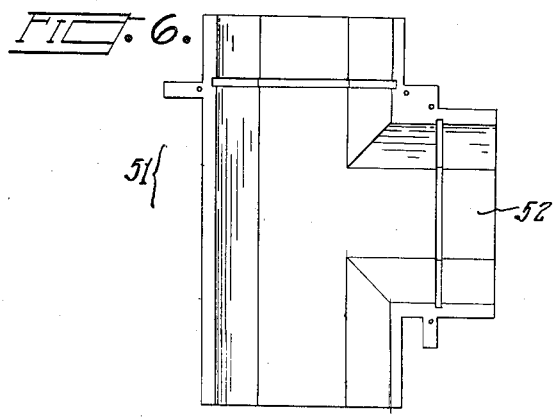
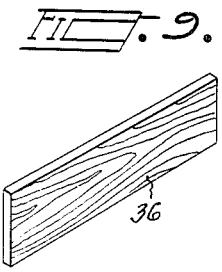
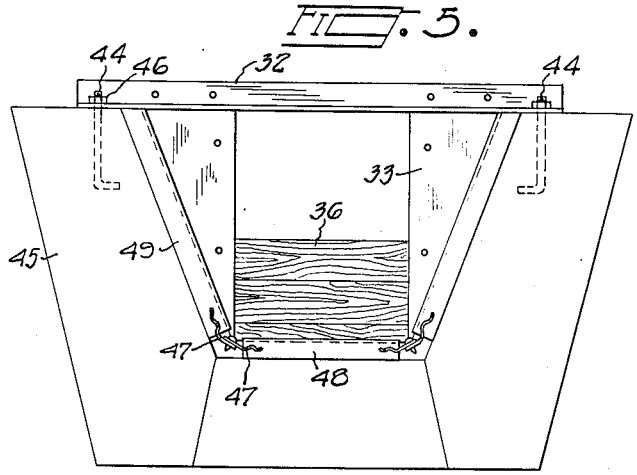
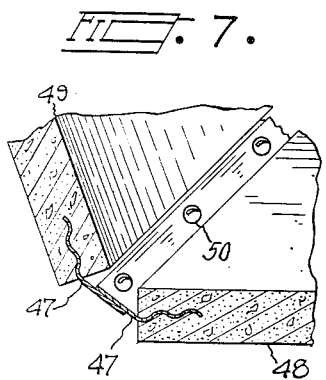
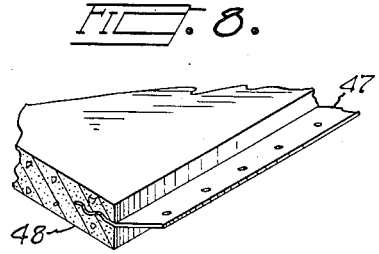
INVENTOR
GEORGE VAN LEEUWEN
BY
ATTORNEY

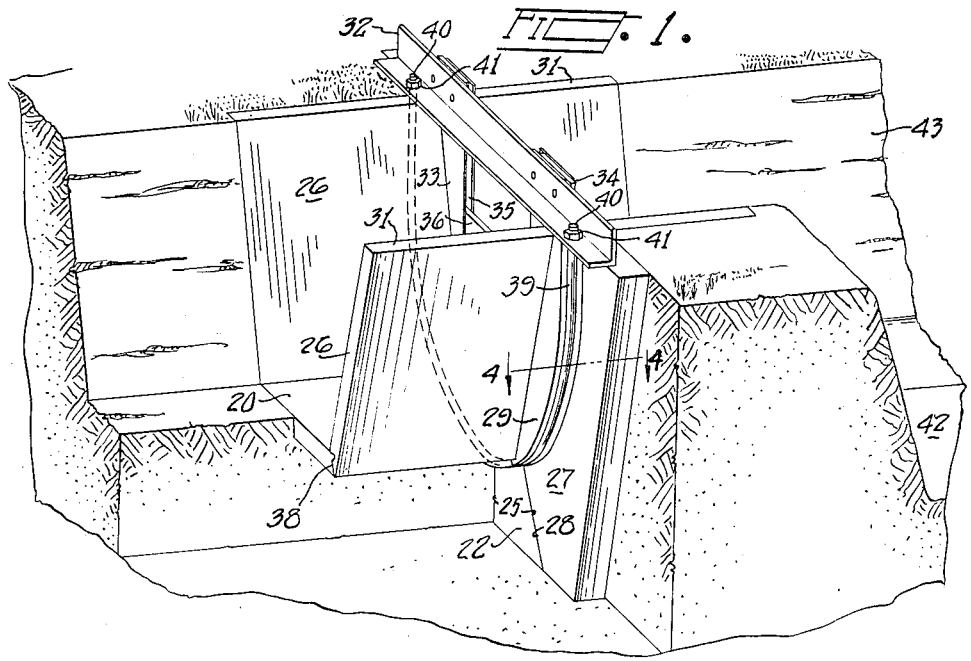
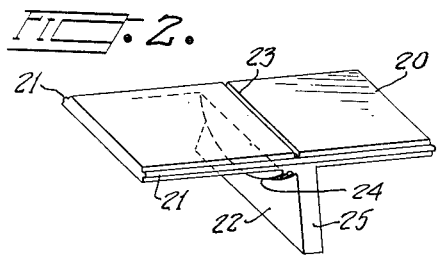
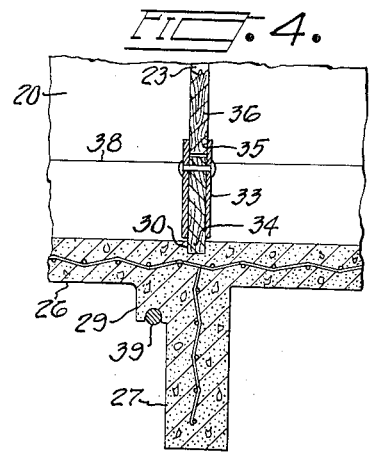
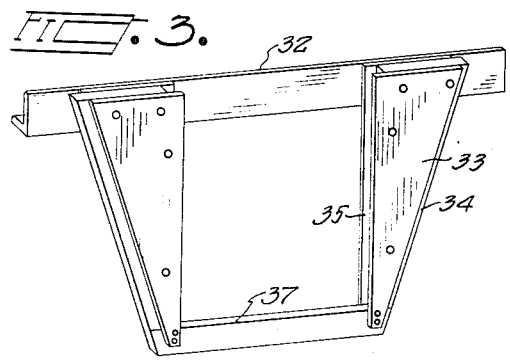
INVENTOR
GEORGE VAN LEEUWEN
ATTORNEY

United States Patent Office 2,778,194
Patented Jan. 22, 1957

2,778,194

FLOW CONTROL GATES

George Van Leeuwen, Salem, Oreg.

Application June 4, 1952, Serial No. 291,629

1 Claim. (Cl. 61—28)

This invention relates generally to irrigation devices and particularly to permanent prefabricated Flow Control Gates.

The main object is to provide a special form of assembled structure which will be more convenient and economical to install than poured-in-place structures.

The second object is to reduce the structure to sections of sizes that are easy to handle.

The third object is to make it possible to clean the entire irrigation ditch system by means of a mechanical ditcher.

The fourth object is to make it possible to maintain an approximately constant ditch level under moderate fluctuations in supply, which is difficult to attain with pipe gates, the most common type of prefabricated structures now used.

The fifth object is to construct a device of the class described which will work equally well as head gates, drop boxes or checks.

The sixth object is to secure a greater relative capacity per depth than pipe gates will afford.

The seventh object is to cause the water to flow over rather than under the gate so that the overflow or surplus capacity is much greater than with pipe gates.

The eighth object is to provide a structure of this class which is not easily plugged by tumbleweeds or debris.

The ninth object is to construct a device which will lend itself to the building of multiple gate structures.

The tenth object is to make it possible to easily arrange the structures in different size combinations.

The eleventh object is to reduce the amount of erosive swirl and velocity as the water leaves the structure that occurs with pipe gates.

The twelfth object is to reduce the weight for a given capacity of duct as compared with pipe gates.

The thirteenth object is to reduce the amount of curing, storing and shipping space required.

The fourteenth object is to form a structure similar in type and operation to common wooden structures long in general use without retaining any of their bad features, thereby meeting less sales resistance.

I accomplish these and other objects in the manner set forth in the following specifications as illustrated in the accompany drawing, in which Fig. 1 is a cut-away perspective view of a typical form of the structure.

Fig. 2 is a perspective view of the bottom plate.

Fig. 3 is a perspective view of the filler plate.

Fig. 4 is a fragmentary section taken along the line 4—4 of Fig. 1.

Fig. 5 is a transverse section showing a modified form of assembly.

Fig. 6 is a plan of T structure employing the method of assembly illustrated in Fig. 5.

Fig. 7 is a fragmentary perspective view showing a form of connector between the bottom and side members.

Fig. 8 is a fragmentary perspective detail showing one of the members illustrated in Fig. 7 prior to joining with its companion member.

Fig. 9 is a perspective view of a gate board.

Fig. 10 is a perspective view of a side member, such as is illustrated in Fig. 1.

Like numbers of reference refer to the same or similar parts throughout the several views.

Referring in detail to the drawing, there is shown in Fig. 1 the preferred form of structure including a floor panel 20 having tongues 21 along its edges and a transverse supporting flange 22 across its under side whose function it is also to prevent water from flowing under the panel 20 and washing away the subsoil. The panel 20 has formed in its top side a transverse groove 23 for the reception of the filler plate which will be described later.

The flange 22 has formed alongside same a grooved arcuate segment flange portion 24. The ends 25 of the flange 22 are bevelled outwardly. Along each side of the floor panel 20 is placed a sloping side panel 26 having an intermediate flange 27 whose end 28 engages the end 25 of the flange 22. The panel 26 also carries on its outer side a grooved arcuate segment flange portion 29 which is in the same transverse plane as is the segment 24. Segment flange portions 24 and 29 are formed as shoulders on the outstanding flanges 22 and 27, as shown in Fig. 4. The side panel 26 is provided with a transverse groove 30 which receives the filler plate.

Across the top edges 31 of the plates 26 in the common plane of segment flange portions 24 and 29 is placed an angle bar 32 to which are attached the tapering filler plates 33, the outer edges 34 of which are tongues which occupy the grooves 30, and the inner edges 35 of which are grooved and vertical and receive the gate boards 36 which rest upon the tie bar 37 which connects the lower ends of the plates 33 and extends into the groove 23. Joints 38 between the panels 20 and 26 can be sealed and filled by a suitable plastic or resilient sealing material or mortar.

Surrounding the segments 24 and 29 and occupying the grooves therein is a clamping band or bolt 39 whose threaded ends 40 project through the bar 32 and are held by the nuts 41.

In Fig. 1 is shown the purpose of the gate board 36 in which a side outlet ditch 42 is formed in the main ditch 43 so that water backed up behind the boards 36 will flow out of the lateral ditch 42 onto the land.

In the form of the device shown in Fig. 5 the segments 24 and 29 are omitted and anchor bolts 44 are imbedded in the flanges 45 and project through the bar 32 and held by the nuts 46. In this form of the device it is desirable to imbed a metal or paper strip 47 in the bottom panel 48 and side panel 49 and connect them by metal screws 50 or in any other convenient manner.

In some cases the channels formed in the outer and inner sides of the strips 47 are filled with a cement mortar.

In Fig. 6 is shown a T fitting 51 which differs from the form shown in Fig. 1 in that a side outlet is formed on one end of the main unit in order to give control of the lateral ditch and avoid scouring action where the water enters the lateral.

The basic idea involved in these permanent structures is the pre-casting of the structure in separate parts of weight, shape and size convenient for handling.

The second basic principle involved relates to the construction which holds the parts to a few simple units which can be made water-tight and in which the filler plates and gate boards can be quickly removed or replaced and, above all, permits quick and easy assembly in the field.

The third principle involved relates to the quick and easy removal of the filler plates and gate boards in order to permit the passage of mechanical ditch cleaning equipment.

The sixth, eleventh and twelfth objects are attained because the water passageway through the structure may be as wide as the bottom of the ditch and nearly as wide as the average working width of the ditch.

The fourth, fifth, seventh, eighth and eleventh objects are attained by this device due to the fact that the water must pass over the gate board and fall onto a non-erosive apron formed by the downstream ends of the members 48 and 49.

The thirteenth object is gained due to the fact that the disassembled members can be more compactly stored during curing and transportation periods.

While reference has been made to the use of concrete parts, it must be understood that although the advantages become most apparent when using concrete, the device can also be made of pressed metal parts whose flanges may be separated to permit nesting.

The form of the device shown in Fig. 1 is merely illustrative of the adaptability of the unit to a wide range of uses. It is, of course, well understood that similar devices have been made of concrete cast en bloc but these are too costly and cumbersome and, if any portion of the unit is damaged in curing or transporting, or setting, the loss attaches to the entire unit. Moreover the ordinary irrigation farmer does not have equipment big enough to handle the unit if cast in one piece.

While the inner edges of the grooves 35 are referred to as being vertical, this refers only to the transverse plane. In actual practice they will lean toward the discharge side whereby that water passing over the top of the gate boards 36 will fall free of the lower boards.

While the form shown in Fig. 6 shows a T fitting, it must be understood that these units can be in the form of a Y or a cross without departing from the spirit of this invention.

I claim:

A flow control gate assembly having a removable gate unit with a rectangular opening for use in an unlined ditch having sloping earth walls requiring periodic cleaning by mechanical ditch cleaning equipment, said assembly comprising a wall structure for supporting said gate unit in a ditch, said wall structure comprising separate, interfitting bottom and sloping side panels adapted to conform to and be permanently incorporated in the earth walls of the ditch, outstanding transverse flanges on said panels adapted to be embedded in the walls of the ditch, arcuate shoulders on said flanges, a horizontal cross bar resting transversely across the top edges of said side wall panels and having ends projecting beyond said side panels, a tension band around said arcuate shoulders, means releasably securing the ends of said band to said projecting ends of said cross bar, and triangular filler plates depending from said bar, said plates having sloping outer edges engaging the inner surfaces of said side panels and spaced parallel inner edges defining said rectangular opening, said inner edges having guides for gate boards, rectangular gate boards in said guides, said cross bar and filler plates constituting said gate unit and being readily removable from said bottom and side wall structure for the passage of said ditch cleaning equipment when said securing means has been released.

References Cited in the file of this patent

UNITED STATES PATENTS

| | | |
|---|---|---|
| 502,474 | Sterling | Aug. 1, 1893 |
| 602,973 | Buttorff | Apr. 26, 1898 |
| 643,695 | Stokes | Feb. 20, 1900 |
| 1,161,997 | Thompson | Nov. 30, 1915 |
| 1,194,951 | Burtis | Aug. 15, 1916 |
| 1,352,929 | Tucker | Sept. 14, 1920 |
| 1,579,288 | Edwards | Apr. 6, 1926 |
| 2,042,350 | McGuire | May 26, 1936 |
| 2,101,538 | Faber | Dec. 7, 1937 |
| 2,697,913 | Bonander et al. | Dec. 28, 1954 |